(12) United States Patent
Chan et al.

(10) Patent No.: US 6,427,151 B1
(45) Date of Patent: Jul. 30, 2002

(54) METHOD, COMPUTER PROGRAM PRODUCT, SYSTEM AND DATA STRUCTURE FOR FORMATTING TRANSACTION RESULTS DATA

(75) Inventors: Christina Lok-sze Chan, Redwood Shores; Gerald Dean Hughes, Morgan Hill, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,125

(22) Filed: Jun. 29, 1999

(51) Int. Cl.[7] .............................................. G06F 17/30
(52) U.S. Cl. ........................ 707/101; 707/102; 707/103
(58) Field of Search .......................... 713/150; 709/217, 709/226, 202, 227, 101; 707/4, 2, 10, 103; 717/2, 5; 705/10; 395/705

(56) References Cited

U.S. PATENT DOCUMENTS 5,960,200 A  *  9/1999  Eager et al. ................. 395/705
6,272,675 B1 *  8/2001  Schrab et al. ................... 717/2

* cited by examiner

*Primary Examiner*—Diane D. Mizrahi
*Assistant Examiner*—Apu M Mofiz
(74) *Attorney, Agent, or Firm*—Gregory M. Plow

(57) ABSTRACT

A method, computer program product, system, and data structure used in mapping data received from a centralized transaction processing system, such as the IMS system available from IBM, at the request of a remote application program or other client made across a communications network, such as the Internet. In one embodiment, a transaction code, a map identifier, and other information necessary for the transaction are sent to a centralized system or server. The transaction is executed on the transaction processing system and results data received therefrom. The map is then accessed in order to format the results data before returning it to the requesting client. One form of information that could be used within a map are source-destination triplets. In this instance, there is a source indicator, a destination offset into a buffer, and a length indicating how much to transfer from the indicated source into a buffer. The source indicator may be either a literal value or an offset into a results data set. An alternative form of map consists of offset-length pairs and literal value-length pairs, where the offset is the offset into the results data and the length is the amount of data to use therefrom into the formatted results data, and the literal value is placed directly into the formatted results data for the specified length. This allows the formatted results data to be tailored to the needs of the client thereby allowing reduced client sophistication and development cost, better bandwidth utilization since only relevant data is sent over the communications network, and higher data security since sensitive data may be prohibited from being sent over the public communications network, such as the Internet.

24 Claims, 6 Drawing Sheets

METHOD, COMPUTER PROGRAM PRODUCT, SYSTEM AND DATA STRUCTURE FOR FORMATTING TRANSACTION RESULTS DATA

BACKGROUND OF THE INVENTION

1. Field of the Invention

The present invention relates to transaction processing systems and databases in a distributed environment where clients or remote application programs access data through transactions executed on a server or host system. More particularly, the present invention deals with ways of formatting the requested data before it is received by the client so as to be in a format readily accessible to the client.

2. Present State of the Art

In centralized transaction processing systems, such as the Information Management System (IMS) available from International Business Machines Corporation (IBM), transactions are executed and in many instances contain results data that is useful to a particular client of the system. Typically, a client of the system is an application running on the host system that was designed along with the database layout.

With the advent of the Internet and the World Wide Web (Web), it is desirable to make the data contained in a centralized transaction processing system more accessible through remote application programs or clients that communicate with software running at the host system or server to access the desired information. Usually, the software running on the host system will execute or have executed a transaction that has results data associated therewith upon completion of the transaction. The results data may include a set of records or segments of a set format.

A remote application program, therefore, must be able to interact with the centralized transaction processing system, understand the format of the results data, and be written in such a manner to parse through all the results data to access the relevant portions of desired data. Because centralized transaction processing systems can be complex, ways are sought to reduce the complexity of remote application development and make it easier to adapt existing remote applications so that they are able to access the desired information over the Internet. It would be desirable to create simplified remote application programs requiring significantly less understanding of the intricacies of a complex centralized transaction processing system.

In many instances, the development cost to adapt an existing remote application program may be prohibitive since an existing tool expects data in a certain format and adapting requires considerable change in order to convert the results data received from a centralized transaction processing system. It would be desirable to be able to return data over the communications network formatted in a way the existing remote application already understands. This would allow a whole host of existing remote applications to adapted in a relatively minor fashion.

Additionally, the proportion of relevant desired data may be small in proportion to each segment or record causing a large amount of useless data to be transmitted over the communications network thereby eating up valuable bandwidth and inhibiting overall performance. The data as organized and accessed in terms of transactions from the centralized transaction manager may contain much more data than is desired by the remote application program. It would be desirable to "filter" the unwanted data by formatting the results data received from the executed transaction before it is returned to the remote application program.

Finally, from a security standpoint, there may be sensitive information that the data owner may not want to be released indiscriminately over a public communications network, such as the Internet. Again, it would be desirable to "filter" sensitive information by formatting the results data received from an executed transaction before it is placed on an unsecure communications network.

SUMMARY OF THE INVENTION

It is an object of the present invention to reduce development complexity of remote application programs, allow easier adaptability of existing remote application programs, and assist in providing general connectivity between data available in the database of a centralized transaction processing system and remote application programs.

It is another object of the present invention to allow better communications network bandwidth utilization.

It is yet another object of the present invention to prevent sensitive information from being placed on an unsecure or public communications network.

Additional objects and advantages of the present invention will be realized from the following description that follows by those skilled in the art or may be learned by practicing the invention. The objects and advantages of the present invention may be obtained by the ways shown and as particularly pointed out in the appended claims.

To achieve the foregoing objects, and in accordance with the invention as embodied and broadly described herein, a method, computer program product, system, and data structure used in mapping data received from a centralized transaction processing system, such as the IMS system available from IBM, at the request of a remote application program or other client made across a communications network, such as the Internet, is provided.

At a point away from a remote application program or other client, such as at the computer that runs the centralized transaction processing system, a transaction can be executed on the centralized transaction processing system, typically at the request of the remote application program. The results data from the transaction is formatted before being received by the remote application program. This formatting provides a mechanism to access only the desired information so that simplified remote application programs can be created that do not need to understand the format of the results data, only the simplified formatted results data. This formatting allows the results data to be returned in a way that an existing remote application program already understands thereby reducing development expense to adapt the existing program to access the information located in the database of the centralized transaction processing system. The formatting prior to receipt also allows sensitive data from being placed onto an unsecure or public communications network, such as the Internet, thereby providing higher data security. Finally, unwanted data may be "filtered" during the formatting process so that the communications network bandwidth is used more efficiently.

Formatting can occur in many different ways that may be recognized by those skilled in the art. A robust formatting scheme will allow data to be added, deleted, changed, or reordered from the transaction results data and do so in a convenient and efficient manner. One embodiment of the present invention utilizes maps that provide formatting instructions to a data mapper that, upon following the instructions, will create the formatted results data that is sent to the remote application program.

For example, a map identifier, a transaction code identifying the transaction to be executed, and any other supporting information is received from the remote application program. The transaction code and optional support information (e.g., query information, etc.) are used to initiate the execution of a transaction that produces results data. The map identifier is used to access a predetermined and stored map having the formatting instructions. Once the results data is formatted, the formatted results data is sent to the remote application program.

One form of information used within a map are data source pairs. Here, one value determines the source of the data and the other value determines how much to use in the formatted results data. The pairs are processed sequentially with each pair indicating a portion of the data. Two main types of data source pairs are used: offset-length pairs and literal value-length pairs. The offset refers to the offset from the beginning of the results data while the literal value would be the actual data to be used. For example, to send the entire results data unchanged and unformatted a single data source pair of the offset-length type would be used where the offset would be zero and the length would be length of the results data.

Another form of information that could be used within a map are source-destination triplets. In this instance, there is a source indicator, a destination offset into a buffer, and a length indicating how much to transfer from the indicated source into a buffer. The source indicator may be either a literal value or an offset into a results data set.

The preceding objects and features of the present invention will become more fully apparent from the following description and appended claims, or may be learned by the practice of the invention as set forth hereafter.

DETAILED DESCRIPTION OF THE INVENTION

Figure 1:
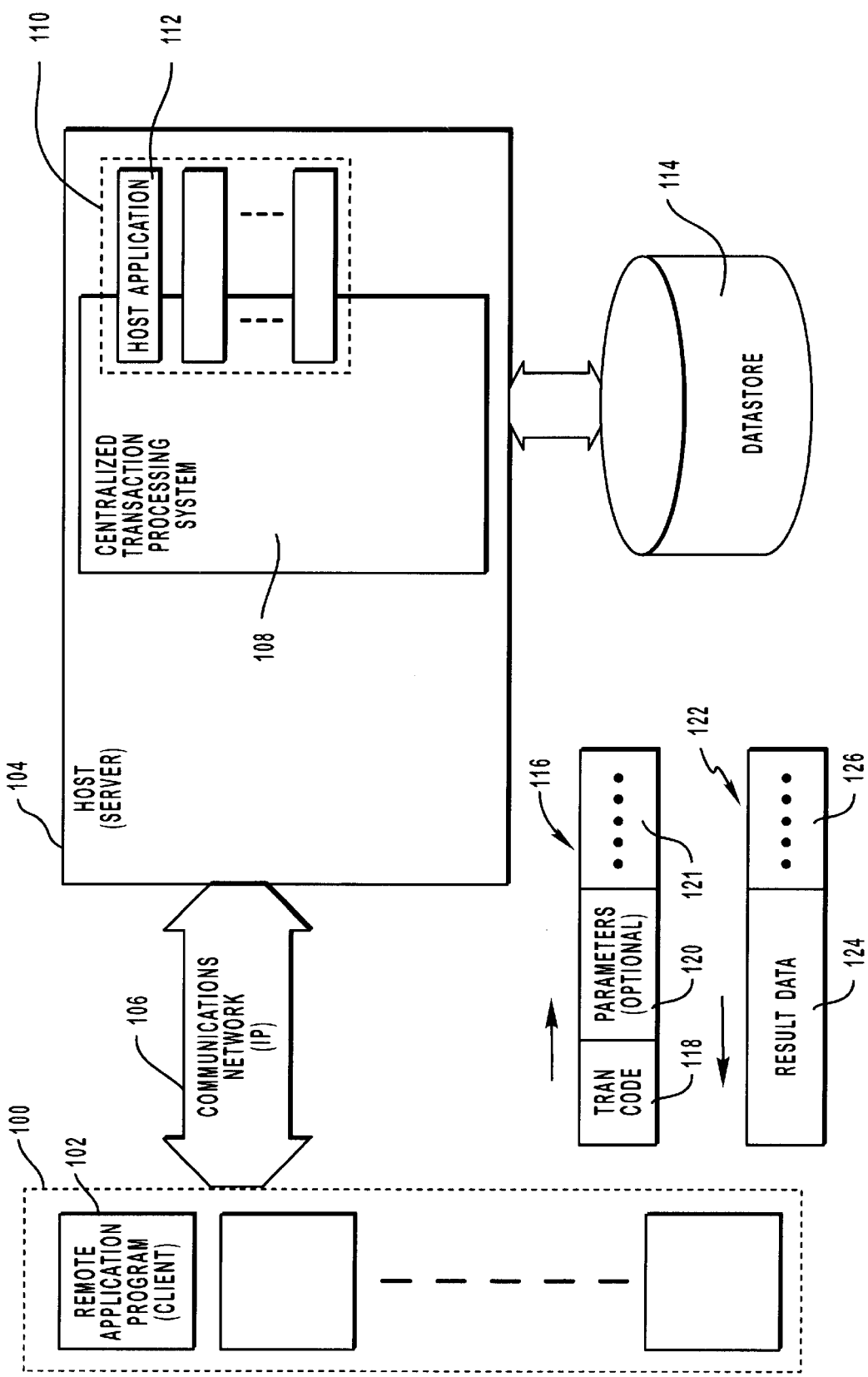
FIG. 1 is a block diagram showing generally the environment of the present invention with a host system having a centralized transaction processing system being accessed by remote application programs over a communications network, such as the Internet, as it is generally undertaken.

As used herein, the term "centralized transaction processing system" means a system that processes transactions that are usually defined by application programs utilizing the system. At least some transactions have data resulting from the execution of the transaction. An example used throughout this application for one embodiment of the present invention is the IMS system available from IBM. Note that many database systems would be incorporated under this definition. Such a centralized transaction system may also be composed of multiple systems working in harmony, such as multiple IMS systems running on the same processor or multiple processors. Those skilled in the art will see the application of the present invention to also cover systems in a distributed environment.

As used herein, the term "results data" refers to any data that is returned as part of an executed transaction. The data may include a record, a set of records, status information, or any other information.

As used herein, the term "transaction" is a discrete and identifiable unit of processing that, in many instances, has resulting data associated therewith of interest to the transaction initiator. A transaction may contain one or more accesses to a database before completing.

With reference to IMS, a transaction is a discrete unit of processing that corresponds to a business transaction and constitutes a logical entity within a host application. In a transaction processing system, one execution of an application program processes a single transaction. The invocation of a transaction may cause the invocation of one or more application programs.

As used herein, the term "transaction identifier" refers to any token, byte code, name, etc. with or without additional parameters that is passed to the centralized transaction processing system and causes it to operate. Such transaction identifier will be defined by host application designers and will be understood by the centralized transaction processing system. In systems where there are not host application programs, transactions will be understood natively by the centralized transaction processing system.

As used herein, the term "remote application program" means any client communicating with a host or server that will request a transaction to be executed and that will receive the resulting data. Within this definition is included stand alone programs running on any computer system or appliance, Internet browsers running JAVA applets or other code to operate as a client, etc.

As used herein, the term "map" means refers to a file, object, section in memory, etc. that contains information for formatting results data from an executed transaction. As described below, one embodiment makes use of data source pairs. One type is an offset-length pair that identifies an offset from the beginning of the results data and the length of relevant data to be included in the formatted data. Another type is a literal value-length pair that includes a literal value of specified length to be included into the formatted results data. Another map embodiment makes use of source-destination triplets. Those skilled in the art will also recognize other information that could be contained within a map that can be used for formatting the results data.

As used herein, the term "map identifier" refers to any token, byte code, name, etc. that can be used to access the map and/or the relevant information contained therein.

As used herein, the term "formatting information" refers to instructions, convention, etc. that can be used to arrange or modify results data.

As used herein, the term "formatting" means adding, deleting, modifying, and or rearranging results data into formatted results data.

As used herein, the term "formatted results data" refers to the results data after the map has been processed causing the results data to be changed.

Referring to FIG. 1, a general description of the environment for transaction processing initiated by remote application programs or other clients is described. A number of clients 100 (enclosed in box), such as remote application program 102, are able to communicate with a host system 104 over a communications network 106. The clients 100 may be any system or appliance able to communicate with the host system 104 and includes PC workstations, handheld PDAs, other host systems or servers, etc. The communications network 106 is preferably an Internet Protocol (IP) network thereby giving very wide access to a large number of potential clients over the Internet. Those skilled in the art will recognize that many other types of communications network may be used and that an IP network is given by way of example and not by limitation.

Running on the host system 104 is a centralized transaction processing system 108 that receives transactions for processing from a variety of host applications represented by enclosing box 110. A host application, such as application 112, is written to take advantage of centralized transaction processing system 108 and will define a number of transactions that can be initiated. In many instances, such transactions will cause access to be made of datastore 114 to either store or retrieve data.

In one embodiment of the present invention, the host system is an IBM mainframe computer, such as an IBM S/390 Enterprise Server, running the OS/390 operating system and IMS Version 6. Furthermore, the currently available IBM software products and components necessary to allow to processing of transaction from external clients over an IP communications network include the following: TCP/IP, IMS TCP/IP OTMA Connection (IMS TOC), Open Transaction Manager Access (OTMA), and the Cross Memory Coupling Facility (XCF).

A host application will also process transactions received from the remote application program 102 or other clients. For example, data packet 116 can be sent from the remote application program 102 to the host system 104 over the communications network 106, and contains a transaction code 118 along with any optional data parameters 120 in order to have the transaction executed (as well as all other information 121). Once received at the host system 104, the transaction can be executed using the transaction code 118 and optional data parameters 120 (if necessary). The appropriate host application program, such as host application program 112, will be utilized during the execution of the specified transaction.

After execution of the transaction and upon receiving any results, the data packet 122 is sent to the remote application program 102 and contains the results data 124 for the executed transaction (as well as all other information 126). The results data will be in "raw" format just as it was received from the centralized transaction processing system 108.

Figure 2:
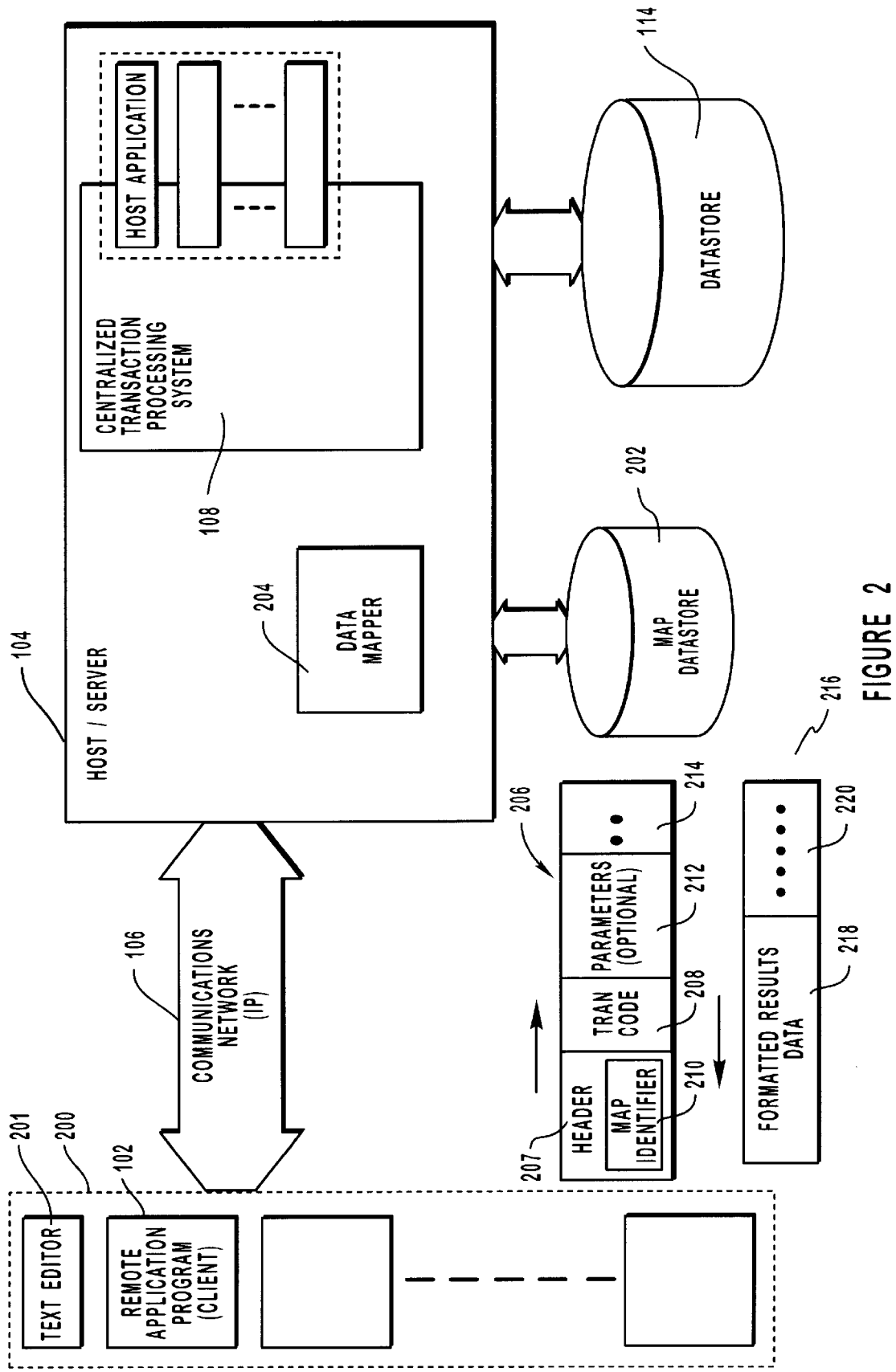
FIG. 2 is a block diagram similar to FIG. 1 and showing the configuration of one embodiment of the present invention.

Referring now to FIG. 2, the operation of the present invention will be explained in detail. The environment is generally the same as shown in FIG. 1 and like numbering applies for the common components found in both Figures.

A map creation tool 200, such as a text editor 201, will be used to create and store a map having formatting information so that results data can be formatted before being returned to the requesting client. Such a map may be stored in a map datastore 202 or elsewhere. Note that any form of storage that can be accessed by a data mapper 204 can be used (e.g., datastore 114). The map creation tool will place the map into the map datastore 202 in the example of FIG. 2 by communicating with the host system 104 over the IP communications network 106 or equivalent. Those skilled in the art will recognize that the predetermined data maps may be stored on a disk, in host system 104 memory, or any other form of storage including the same datastore containing the results data, such as datastore 114. The nature and use of the map will be explained in more detail below.

When a requesting client, such as remote application program 102, desires formatted data, it will send a data packet 206 containing a header 207, a transaction code 208, a map identifier 210 in the header, and any optional data parameters 212 in order to have the transaction executed (as well as all other information 214). Once received at the host system 104, the transaction can be executed using the transaction code 208 and optional data parameters 210 (if necessary).

After execution of the transaction and upon receiving any results, the data mapper 204 will use the map identifier 210 from the inbound data packet 206 to access a previously stored map from datastore 202. The data mapper will process the results data according to the map to create formatted results data that can then be returned to the requesting client by way of outbound data packet 216.

The data packet 216 is sent to the remote application program 102 and contains the formatted results data 218 for the executed transaction (as well as all other information 220). The results data will be formatted into a form expected or useful to the remote application program 102. In this manner, clients may receive data contained in the centralized transaction processing system without knowing the entire intricacies of data format within a transaction.

Those skilled in the art will see a variety of variations to the architecture here illustrated that are still within the scope of the invention defined by the claims found hereafter. For example, rather than having the client send the map identifier, the linkage between a transaction and a particular map could be made in some other way. A single map could be defined for a each type of transaction that will format the results data in the same way regardless of who the requesting client. In such a scenario, the map could be ascertained by reference to the transaction code alone.

In another example with a database implementation, a query or other information could be received from the client. Based on what was received from the client, a transaction could be ascertained and executed. Again the results data would be formatted using a map that could be determined before the results data is received from the database system. The determination could be based on the information received from the client, the transaction code, or any combination of the two. Such a system could allow clients to access the data held in the database with the most minimal of modification or without being rewritten at all. By formatting the results data using the map allows the desired data to be returned in the same format as received from other systems.

Finally, the functionality of the data mapper 204 may reside anywhere between the client, such as remote application program 102, and the centralized transaction processing system 108 so as to be in a position to intercept the results data, format it using a map, and return it to a requesting client. Those skilled in the art will appreciate there may be one or more intermediate computer systems between the client and the host system. For example, the client may communicate with a Web server that in turn communicates with a host system having a centralized transaction processing system therein. In such an arrangement, it would be considered within the scope of the present invention as defined in the claims hereafter to have the data mapper functionality at the Web server (as opposed to at the host) or shared between the Web server and the host system.

In one embodiment of the present invention, the data mapping functionality resides at the host system in the IMS TOC product as part of a user message exit.

Figure 3:
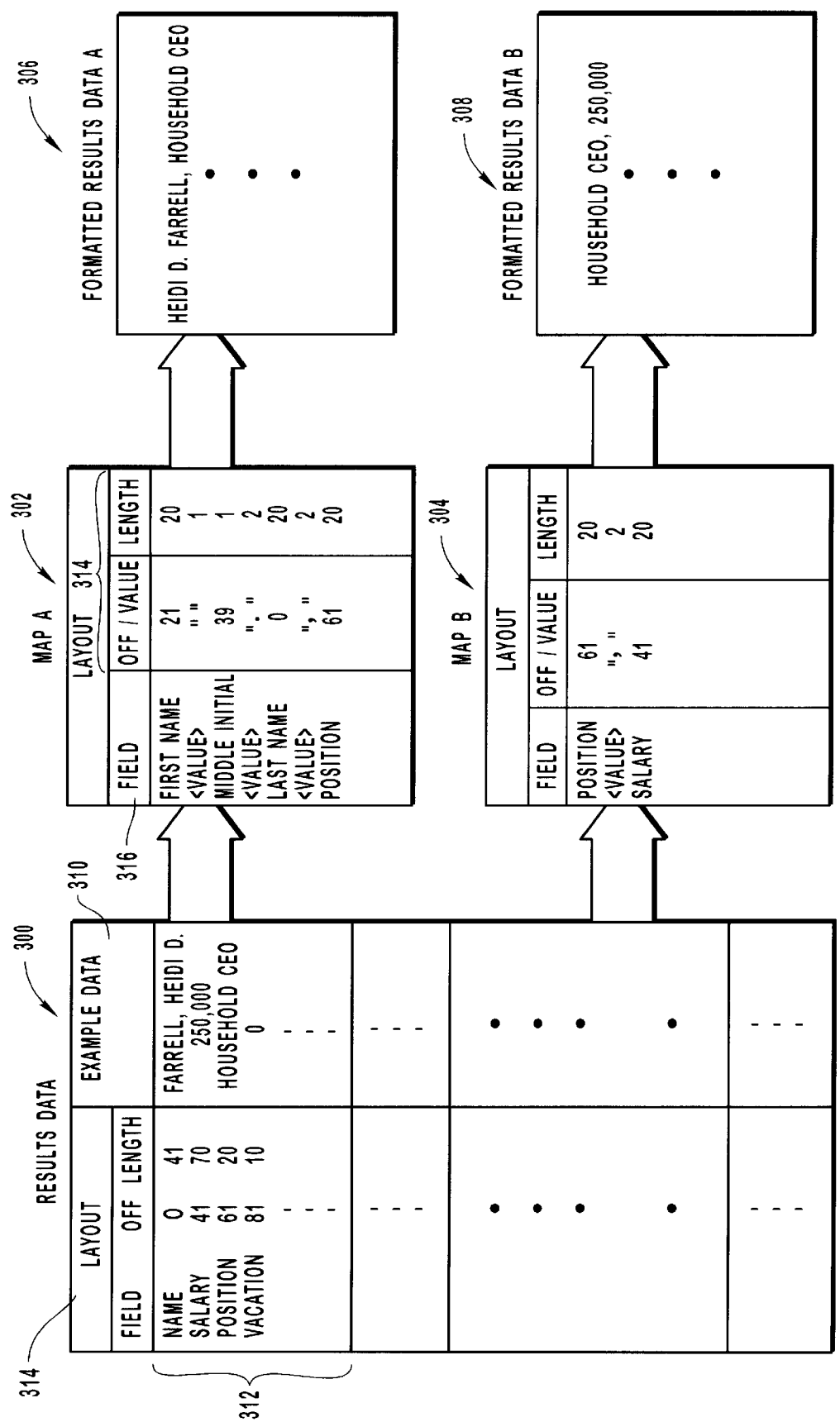
FIG. 3 is a logical diagram illustrating how the results data from a requested transaction is transformed into formatted results data using a map containing data source pairs.

While a map may take on many different formats, one example of a map and its use by a data mapper is shown in FIG. 3. Note that this form of data map is given by way of example and not by limitation and that those skilled in the art will appreciate other ways in which to devise a map.

Referring now to FIG. 3, a logical diagram is shown where results data having a certain format is transformed by use of a map into formatted results data to be received by the client. FIG. 3 shows results data 300 that may be formatted by using map A 302 or Map B 304 into formatted results data A 306 or formatted results data B 308, respectively.

The results data 300 is shown having example data 310 and an associated layout 314 for ease of understanding. Furthermore, the results data 310 is organized and returned in terms of records as shown by bracket 312. Using a map will allow the example data 310 to be formatted into a more useful form by selectively using only portions of the record (typically the smallest unit that is available), reordering elements or fields within the record, and adding information where appropriate.

Map A 302, as shown, is broken into data source pairs 314 and interpretive comments 316 regarding the fields of the results data 300 indicated by the data source pairs 314. The data source pairs 314 are of two varieties, offset-length pairs and literal value-length pairs.

The offset-length pairs have an offset into the results data used as a beginning point for acquiring data into what will become the formatted results data. The length component indicates how much data to use from the results data. The offset may be a pointer address, a relative number of bytes or other measurement from the beginning of the results data, or any other mechanism that will indicate a starting point within the results data.

In one embodiment of the present invention, the offset is the number of bytes from the beginning of the results data and the length is the number of bytes that will be transferred or placed into the formatted results data. The length is also used as counter to know when the required number of bytes have been acquired, such as when filling an internal buffer before sending the formatted results data. Note that those skilled in the art will appreciate that a buffer need not be used, the formatted results data could be composed and sent dynamically with the bytes being transmitted as soon as they are identified.

Another type of data source pair 314, is the literal value-length pair. A literal value is stored in the map that will be used directly as part of the formatted results data. The length indicates how long the literal value is and can also be used as a counter for use in transferring the literal value to a buffer. Those skilled in the art will recognize that the length may be omitted from the map and be calculated on the fly while parsing the literal value.

Offset-length pairs and literal value-length pairs may be differentiated from one another in many ways known to those skilled in the art and including the use of an "escape" value to signify the presence of a literal value. In one embodiment, the literal value-offset pair is represented by "" and can be recognized during parsing.

By applying the map A 302 to the example data 310 of the results data 300, formatted results data A 306 is created and sent to a requesting client. Note that for the first record (or segment) the full name was reordered, punctuation characters added, and sensitive information, such as the salary information, was omitted.

A map is tied to a particular instance of a transaction code and expects results data in a certain format. This means that a multiple maps may be associated with a particular transaction code allowing different remote applications to be easily developed. Because the map expects results data in a certain format, the map can be stored very economically in the data source pair format. Furthermore, different maps can give different formatted results when using the same transaction code and receiving the same results data. For example, when map B 304 is applied to the example data 310 of the results data 300, a different set of formatted results data is produced, namely formatted results data B 308.

The use of a map by a data mapping facility allows: (a) construction of simplified remote applications by relieving remote application providers the burden of understanding the intricacies of access and full data configuration of a complex host based centralized transaction processing system, such as IMS; (b) sensitive data to be retained at the host system and not sent over a public communications network, such as the Internet; and (c) results data to be formatted into a form that requires a minimum of modification to existing client applications. Furthermore, if the data mapper creates the formatted results data on the host having the centralized transaction processing system, undesired data is not sent over the communications network thereby allowing for better bandwidth utilization.

Figure 4:
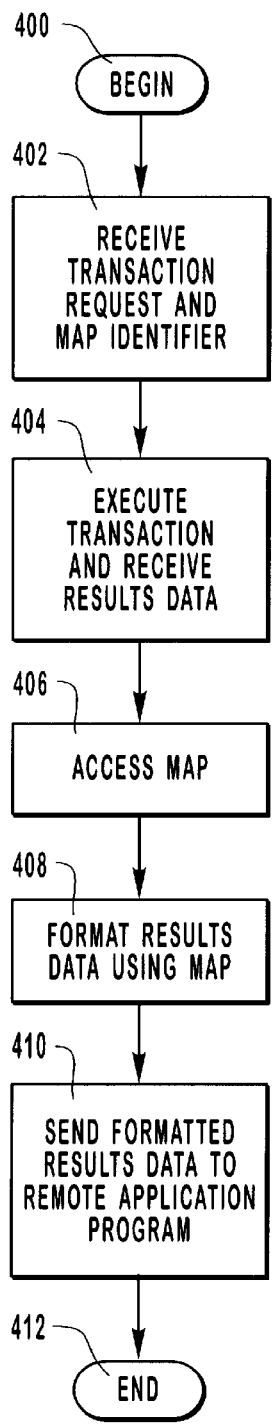
FIG. 4 is a flowchart showing the processing steps for receiving a transaction and map identifier and returning the formatted results data that have been formatted according to the specified map.

Referring now to FIG. 4, a flowchart explaining the processing steps taken according to one embodiment of the present invention is shown and now explained. After beginning at step 400, a software component will receive from a remote application program or other client a map identifier and a transaction request. As noted previously, the software component may be anywhere between the centralized transaction processing system that will execute the transaction and the remote application program. In many instances it is preferable to have the map located on the host system where the centralized transaction processing system in running since one potential benefit of the invention is to prevent sensitive data from being placed on a public communications network, such as the Internet.

At step 404, the software component causes the specified transaction to be executed on the centralized transaction processing system and receives after execution the corresponding results data. Access to the specified map is made at step 406. Note that different maps for the same results data may be accessed depending on what map identifier was sent with the transaction code in the original request, thus providing added flexibility. Note also that those skilled in the art may assign a default map by convention.

Figure 5:
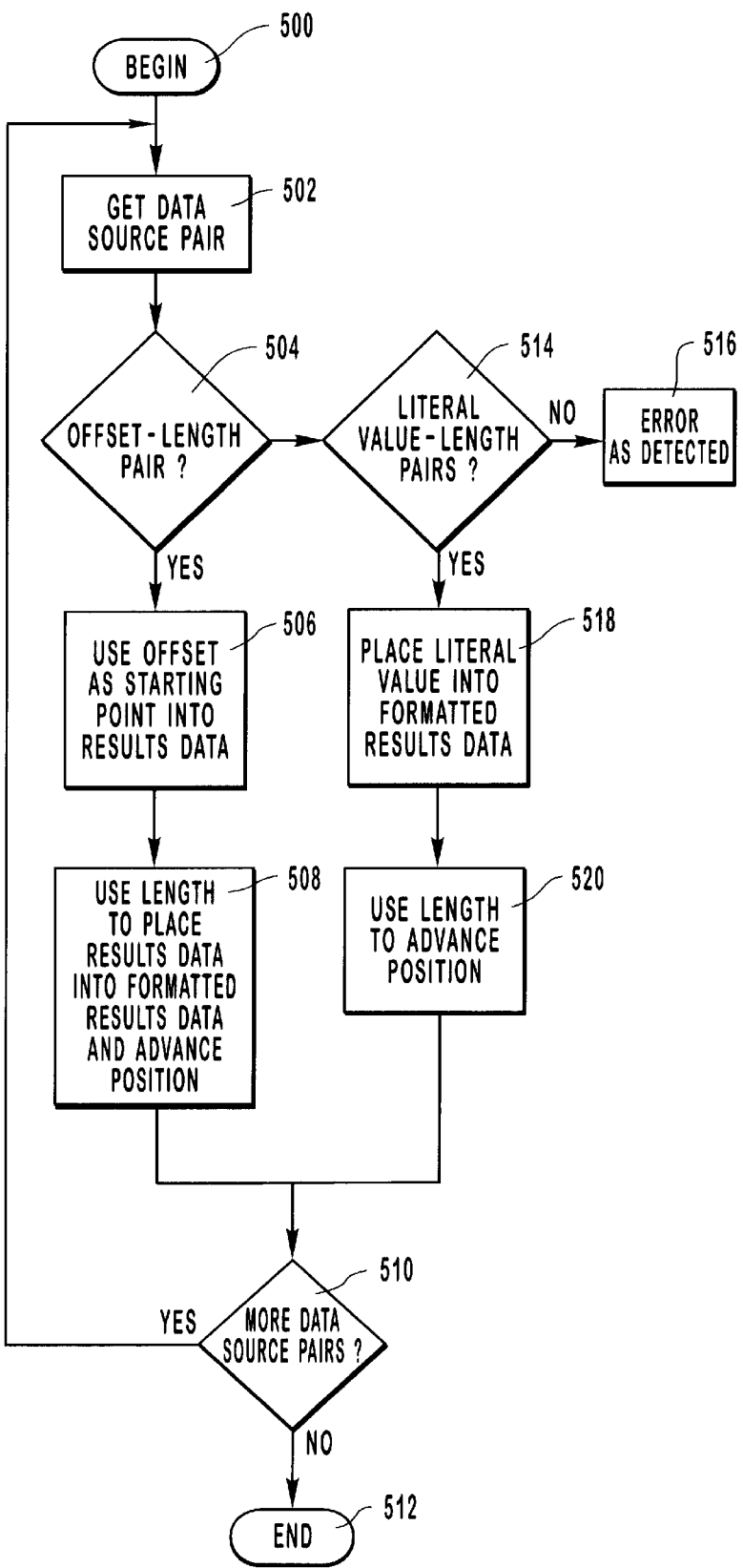
FIG. 5 is a flowchart showing the processing steps for processing a series of data source pairs and creating the formatted results data therefrom. The data source pairs include offset-length pairs and literal value-length pairs.

The results data is then formatted at step 408 using the information contained in the previously accessed map. The map information may be instructions as to where to obtain data (e.g., offset-length pair), data to be included (e.g., literal value-offset pair), instructions pertaining to omitting data, other instructions, etc. FIG. 5 explained hereafter shows how a map of data source pairs is processed according to one embodiment of the present invention. The end product of step 408 is the formatted results data.

At step 410, the formatted results data are sent to the remote application program. By specifying a map, the remote application program has avoided the intricacies of parsing a set of results data that may have a proportionately small amount of desired data.

Referring now to FIG. 5, a flowchart showing the processing steps for a data mapper component or other computer processing component(s) taken to process a map comprised of data source pairs. After beginning at step 500, a data source pair is acquired and analyzed at step 502.

If the data source pair is an offset-length type pair as determined at step 504, the offset is used as a starting point within the results data at step 506. Given the offset, some embodiments may require calculations to arrive at the precise point within the results data.

At step 508, the length portion of the offset-length pair is used as a counter to place the specified number of bytes (or other measurement basis) into the formatted results data. The length may also be used to advance tracking pointers within a formatted results data buffer.

Once the data specified by the offset-length pair has been placed into the formatted results data (whether into a buffer or directly transmitted to the remote application program), a test is made at step 510 to determine whether there are remaining data source pairs for processing. If so, processing is repeated with acquisition and analysis of the next data source pair at step 502. If no data source pairs remain, processing ends at step 512.

If the determination at step 504 is that the data source pair is not an offset-length pair, then a determination is made at step 514 whether the data source pair is a literal value-length pair. If the data source pair is not a literal value-length pair (or an offset-length pair) then it is either a different kind of source pair, other valid or relevant information, or an error condition and the appropriate processing takes place at step 516.

If the data source pair is a literal value-length pair as determined at step 514, then the literal value is placed into the formatted results data (again, either in a buffer or transmitted directly) at step 518. The length is used at step 520 to advance the position within the buffer since the length equals the number of bytes or other measurement unit of the literal value. As explained previously, those skilled in the art will appreciate that some embodiments may omit the length on a literal value-length pair, preferring instead to calculate the length on the fly.

Finally, a check is made for any remaining data source pairs at step 510 before either continuing onto acquiring other data source pairs at step 502 or ending data source pair processing at step 512.

Figure 6:
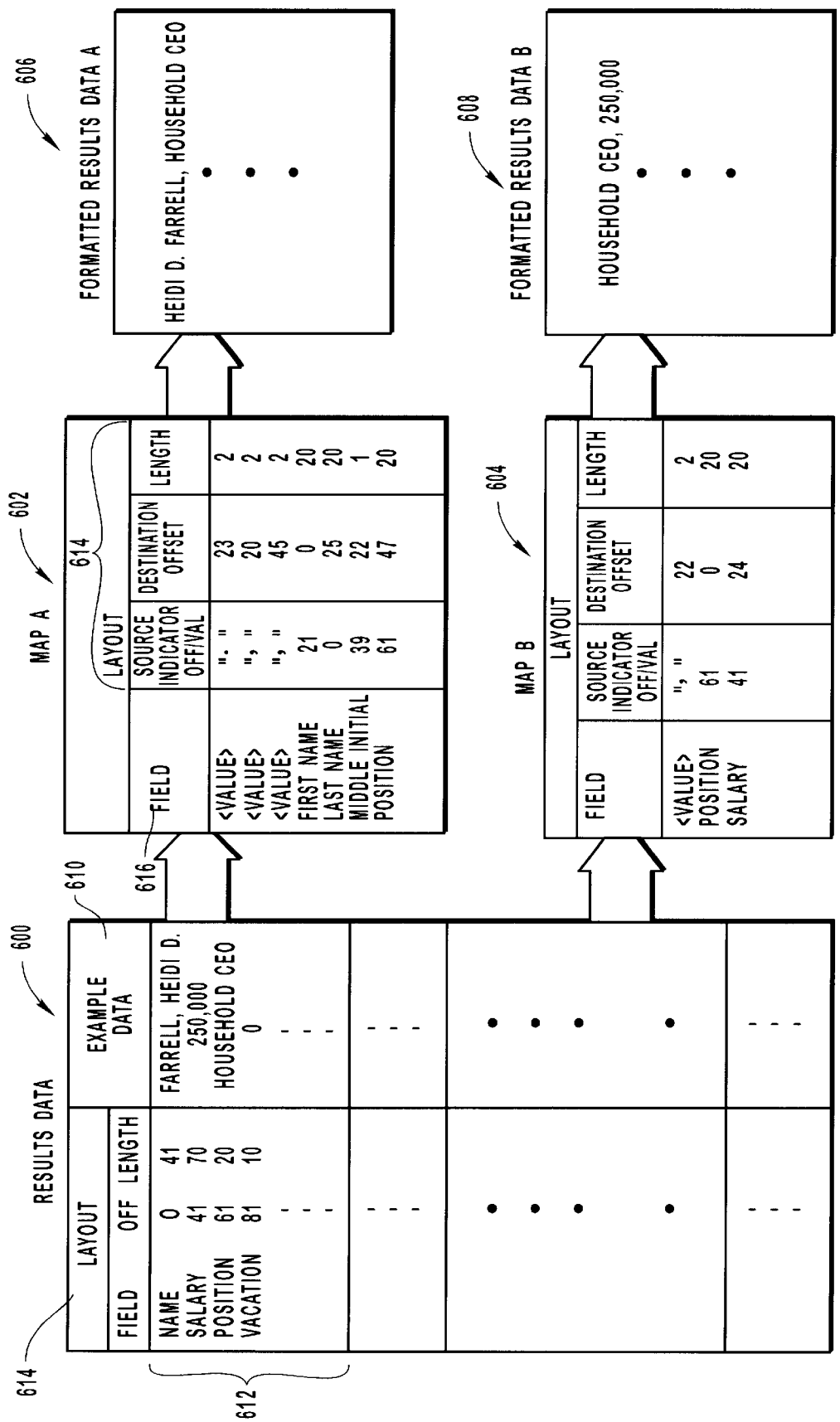
FIG. 6 is a logical diagram illustrating how the results data from a requested transaction is transformed into formatted results data using a map containing source-destination triplets. It uses the same example data as FIG. 3 and arrives at the same formatted results data.

Referring now to FIG. 6, a logical diagram is shown where results data having a certain format is transformed by use of a map into formatted results data to be received by the client that uses a different map format than that shown in FIG. 3. The initial results data and formatted results data are the same. FIG. 6 shows results data 600 that may be formatted by using map A 602 or Map B 604 into formatted results data A 606 or formatted results data 608, respectively. Map A 602 and Map B 604 utilize a series of source-destination triplets and are of a different format than the respective maps shown in FIG. 3.

The results data 600 is shown having example data 610 and an associated layout 614 for ease of understanding.

Furthermore, the results data 610 is organized and returned in terms of records as shown by bracket 612. Using a map will allow the example data 610 to be formatted into a more useful form by selectively using only portions of the record (typically the smallest unit that is available), reordering elements or fields within the record, and adding information where appropriate.

Map A 602, as shown, is broken into a series of source destination triplets 614 and interpretive comments 616 regarding the fields of the results data 600 indicated by the source-destination triplets 314. The source destination triplets 314 comprise a source indicator, a destination offset, and a length.

The source indicator is used to determine the origin of the data to be used in the formatted results data. In one embodiment, the source indicator is one of two varieties, a source offset or a literal value. The source offset is an offset into the results data used as a beginning point for acquiring data that will used for the formatted results data. A literal value is stored in the map and will be used directly as part of the formatted results data. Literal values and source offsets may be differentiated from one another in many ways known to those skilled in the art and including the use of an "escape" value to signify the presence of a literal value. In one embodiment, the literal value-offset pair is represented by "" and can be recognized during parsing.

The destination offset is an offset into the formatted results data and is used as a beginning point for the transferred or placed data indicated by the source indicator.

The length indicates how much data to transfer to the formatted results data. Data will originate as indicated by the source indicator and be placed or transferred at the offset indicated by the destination offset.

By applying the map A 602 to the example data 610 of the results data 600, formatted results data A 606 is created and sent to a requesting client. Note that for the first record (or segment) the full name was reordered, punctuation characters added, and sensitive information, such as the salary information, was omitted.

A map is tied to a particular instance of a transaction code and expects results data in a certain format. Therefore, the map can be stored very economically in the source-destination triplet format. Furthermore, different maps can give different formatted results. For example, when map B 604 is applied to the example data 610 of the results data 600, a different set of formatted results data is produced, namely formatted results data B 608. Map B 608 has been used to successfully remove sensitive salary information from the results data.

Again, the use of a map by a data mapping facility allows development of simplified remote application programs, sensitive data to be retained at the host system and not sent over a public communications network, results data to be formatted into a form that requires a minimum of modification to existing client applications, and relieves remote application providers the burden of understanding the intricacies of access and full data configuration of a complex host based centralized transaction processing system, such as IMS. Furthermore, if the data mapper creates the formatted results data on the host having the centralized transaction processing system, undesired data is not sent over the communications network thereby allowing for better bandwidth utilization.

Figure 7:
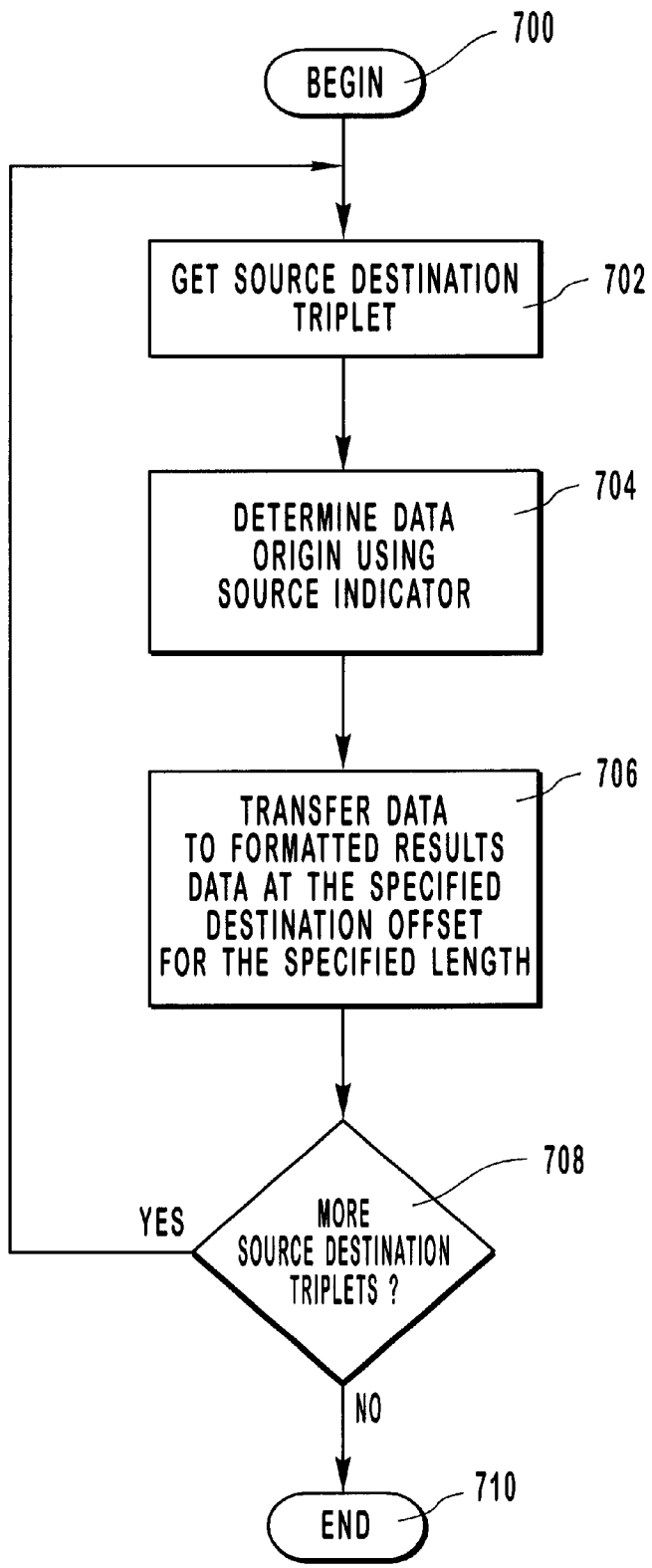
FIG. 7 is a flowchart showing the processing steps for processing a series of source-destination triplets and creating the formatted results data therefrom.

Referring now to FIG. 7, a flowchart showing the processing steps for a data mapper component or other computer processing component(s) taken to process a map comprised of source-destination triplets, such as those shown in FIG. 6. After beginning at step 600, a source-destination triplet is acquired and analyzed at step 602.

At step 704, the source indicator is processed to determine the origin of the data that will be transferred or placed into the formatted results data. If the source indicator is a destination offset, the destination offset is used as a starting point within the results data for data to be transferred or placed into the formatted results data. If the source indicator is a literal value, then the literal value found in the map will be transferred or placed into the formatted results data.

The length is used at step 706 to count the amount of data (e.g., bytes) transferred or placed from the source indicator as explained above to the formatted results data. Note that the formatted results data will not necessarily be created sequentially (i.e., beginning at offset 0 and continuing to the end) as will occur with maps using the data source pair format explained previously. The last part of formatted results data may be created before the first element of the results data, depending on the ordering of the source-destination triplets. In both the examples of FIG. 3 and FIG. 6, however, the same formatted results data is created.

Once the data specified by the source-destination triplet has been placed into the formatted results data, a test is made at step 708 to determine whether there are remaining data source pairs for processing. If so, processing is repeated with acquisition and analysis of the next source-destination triplet at step 702. If no source-destination triplets remain, processing ends at step 710.

As will be understood by one of ordinary skill in the art, computer programs such as that described herein are typically distributed as part of a computer program product that has a computer useable medium containing the program code. Therefore, "media", or "computer useable media", as used herein, may include a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered a computer program product.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "on" a medium is intended to encompass the above and all equivalent ways in which the instructions or software is associated with a computer useable medium.

For simplicity, the term "computer program product" is used to refer to a computer useable medium, as defined above, which bears or has embodied thereon any form of software or instructions to enable a computer system (or cooperating systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The map, as described above, is a data structure and has a tangible embodiment in a computer useable medium when stored in a file, when loaded into system memory, when transported across a communications network, etc. in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

What is claimed is:

1. A method for formatting transaction results data prior to sending such data to requesting client programs comprising:

executing a transaction on a database system and receiving results data;

formatting the results data from the executed transaction to a more useful form using a predetermined map, said predetermined map directing one or more formatting operations selected from the group consisting of deleting a portion of the results data, reordering the results data and adding other information to the results data; and sending the formatted results data to a requesting client.

2. A method as recited in claim 1 wherein the database system is an IMS database system.

3. A method as recited in claim 1 wherein the predetermined map includes at least one offset-length pair where the offset indicates the beginning location within the results data for the formatted data and the length indicates how much of the results data to use as part of the formatted results data and formatting occurs by acquiring data beginning at the offset for the specified length and placing it into the formatted results data.

4. A method as recited in claim 1 wherein the predetermined map includes at least one literal value where the literal value indicates an actual value for the formatted results data and formatting occurs by placing the literal value into the formatted results data.

5. A method as recited in claim 1 wherein the predetermined map includes a series of offset-length pairs to create the formatted results data and where the offset indicates the beginning location within the results data for the formatted data and the length indicates how much of the results data to use as part of the formatted results data and formatting occurs by acquiring data beginning at the offset for the specified length and placing it into the formatted results data for each offset-length pair.

6. A method as recited in claim 1 wherein:

the predetermined map includes a series of offset-length pairs and literal value-length pairs to create the formatted results data, where:

for the offset-length pairs, the offset indicates the beginning location within the results data for the formatted data and the length indicates how much of the results data to use as part of the formatted results data; and for the literal value-length pairs, the literal value indicates an actual value for the formatted results data and the length indicates how much of the literal value to use as part of the formatted results data; and formatting occurs by acquiring data beginning at the offset for the specified length for each offset-length pair and placing it into the formatted results data, and placing the literal value into the formatted results data for the specified length for each literal value-length pair.

7. A computer program product comprising a computer usable medium having computer-executable instructions embodied therein to perform the method as recited in claim 1.

8. In a transaction processing environment with remote application programs requesting execution of transactions on a centralized transaction processing system that, in turn, returns results data, a method for formatting transaction results data before receipt of the same by the remote application programs comprising:

receiving from a remote application program a transaction identifier that identifies a transaction to be executed on a centralized transaction processing system and a map identifier that identifies a map containing formatting information for the results data;

executing the transaction on the centralized transaction processing system using the received transaction identifier and receiving the results data from the executed transaction;

formatting the results data to a more useful form according to the map accessed using the map identifier before sending the formatted results data to the remote application program, wherein said map accessed using the map identifier directs one or more formatting operations selected from the group consisting to deleting a portion of the results data, reordering the results data and adding other information to the results data.

9. A method as recited in claim 8 wherein all steps occur at the centralized transaction processing system.

10. A method as recited in claim 8 wherein the centralized transaction processing system is an IMS transaction processing system.

11. A method as recited in claim 8 wherein the identified map includes at least one offset-length pair where the offset indicates the beginning location within the results data for the formatted data and the length indicates how much of the results data to use as part of the formatted results data.

12. A method as recited in claim 8 wherein the identified map includes at least one literal value where the literal value indicates an actual value for the formatted results data.

13. A method as recited in claim 8 wherein the identified map includes a series of offset-length pairs to create the formatted results data and where the offset indicates the beginning location within the results data for the formatted data and the length indicates how much of the results data to use as part of the formatted results data.

14. A method as recited in claim 8 wherein the identified map includes a series of source-destination triplets, the source-destination triplet comprising a source indicator, a destination offset, and a length, where:

the source indicator determines the origin of the data to be used in the formatted results data and may be a source offset indicating the beginning location within the results data or a source literal indicating an actual value to be used;

the destination offset indicates the beginning location within the formatted results data where the data will be placed; and and the length indicates how much data to use as part of the formatted results data; and formatting occurs by acquiring data using the source indicator and transferring it into the formatted results data at the destination offset for the specified length.

15. A computer program product comprising:

a computer usable medium;

computer readable instructions embodied on said computer useable medium for use in a transaction processing environment with remote application programs requesting execution of transactions on a centralized transaction processing system that, in turn, returns results data, and for formatting transaction results data before receipt of the same by the remote application programs, the instructions directing a computer to perform the steps of:

receiving from a remote application program a transaction identifier that identifies a transaction to be executed on a centralized transaction processing system and a map identifier that identifies a map containing formatting information for the results data;

executing the transaction on the centralized transaction processing system using the received transaction identifier and receiving the results data from the executed transaction:

formatting the results data to a more useful form according to the map accessed using the map identifier before sending the formatted results data to the remote application program, wherein said map accessed using the map identifier directs one or more formatting operations selected from the group consisting of deleting a portion of the results data, reordering the results data and adding other information to the results data.

16. A computer program product as recited in claim 15 wherein the identified map includes at least one offset-length pair where the offset indicates the beginning location within the results data for the formatted data and the length indicates how much of the results data to use as part of the formatted results data.

17. A computer program product as recited in claim 15 wherein the identified map includes at least one literal value where the literal value indicates an actual value for the formatted results data.

18. A computer program product as recited in claim 15 wherein the identified map includes a series of offset-length pairs to create the formatted results data and where the offset indicates the beginning location within the results data for the formatted data and the length indicates how much of the results data to use as part of the formatted results data.

19. A computer program product as recited in claim 15 wherein the identified map includes a series of source-destination triplets, the source-destination triplet comprising a source indicator, a destination offset, and a length, where:

the source indicator determines the origin of the data to be used in the formatted results data and may be a source offset indicating the beginning location within the results data or a source literal indicating an actual value to be used;

the destination offset indicates the beginning location within the formatted results data where the data will be placed; and and the length indicates how much data to use as part of the formatted results data; and formatting occurs by acquiring data using the source indicator and transferring it into the formatted results data at the destination offset for the specified length.

20. In a transaction processing environment with remote application programs requesting execution of transactions on a centralized transaction processing system that, in turn, returns results data, a system for formatting transaction results data before receipt of the same by the remote application programs comprising:

a CPU;

a storage means, electronically coupled and responsive to said CPU, for storing a map that can be used for formatting transaction results data;

interface means for receiving from a remote application program a transaction identifier that identifies a transaction to be executed on a centralized transaction processing system and a map identifier that identifies a map containing formatting information for the results data;

execution means for causing the transaction to be executed on the centralized transaction processing system using the received transaction identifier and receiving the results data from the executed transaction;

formatting means for processing the results data into a more useful form according to the map stored on the storage means that is accessed using the map identifier before sending the formatted results data to the remote application program, wherein said map accessed using the map identifier directs one or more formatting operations selected from the group consisting of deleting a portion of the results data, reordering the results data and adding other information to the results data.

21. A system as recited in claim 20 wherein the identified map includes at least one offset-length pair where the offset indicates the beginning location within the results data for the formatted data and the length indicates how much of the results data to use as part of the formatted results data.

22. A system as recited in claim 20 wherein the identified map includes at least one literal value where the literal value indicates an actual value for the formatted results data.

23. A system as recited in claim 20 wherein the identified map includes a series of offset-length pairs to create the formatted results data and where the offset indicates the beginning location within the results data for the formatted data and the length indicates how much of the results data to use as part of the formatted results data.

24. A system as recited in claim 20 wherein the identified map includes a series of source-destination triplets, the source-destination triplet comprising a source indicator, a destination offset, and a length, where:

the source indicator determines the origin of the data to be used in the formatted results data and may be a source offset indicating the beginning location within the results data or a source literal indicating an actual value to be used;

the destination offset indicates the beginning location within the formatted results data where the data will be placed; and and the length indicates how much data to use as part of the formatted results data; and formatting occurs by acquiring data using the source indicator and transferring it into the formatted results data at the destination offset for the specified length.

* * * * *

UNITED STATES PATENT AND TRADEMARK OFFICE
CERTIFICATE OF CORRECTION

PATENT NO. : 6,427,151 B1
DATED : July 30, 2002
INVENTOR(S) : Christina Lok-Sze Chan and Gerald Dean Hughes It is certified that error appears in the above-identified patent and that said Letters Patent is hereby corrected as shown below:

Column 12,
Line 33, after "predetermined map," insert -- wherein: the predetermined map includes a series of source-destination triplets, the source-destination triplets to create the formatted results data, the source destination triplet comprising a source indicator, a destination offset, and a length, where: the source indicator determines the origin of the data to be used in the formatted results data and may be a source offset indicating the beginning location within the results data or a source literal indicating an actual value to be used wherein the destination offset indicates the beginning location within the formatted results data where the data will be placed and the length indicates how much data to use as part of the formatted results data and formatting occurs by acquiring data using the source indicator and transferring it into the formatted results data at the destination offset for the specified length, --

Column 13,
Line 30, after "results data:" insert -- wherein the identified map includes a series of offset-length pairs and literal value-length pairs to create the formatted results data, where, for the offset-length pairs, the offset indicates the beginning location within the results data for the formatted data and the length indicates how much of the results data to use as port of the formatted results data and, for the literal value-length pairs, the literal value indicates an actual value for the formatted results data and the length indicates how much of the literal value to use as part of the formatted results data;--

Column 14,
Line 29, after "data;" insert -- wherein the identified map includes a series of offset-length pairs and literal value-length pairs to create the formatted results data, where, for the offset-length pairs, the offset indicates the beginning location within the results data for the formatted data and the length indicates how much of the results data to use as part of the formatted results data and, for the literal value-length pairs, the literal value indicates an actual value for the formatted results data and the length indicates how much of the literal value to use as part of the formatted results data. --

UNITED STATES PATENT AND TRADEMARK OFFICE
CERTIFICATE OF CORRECTION

PATENT NO. : 6,427,151 B1
DATED : July 30, 2002
INVENTOR(S) : Christina Lok-Sze Chan and Gerald Dean Hughes It is certified that error appears in the above-identified patent and that said Letters Patent is hereby corrected as shown below:

<u>Column 15,</u>
Line 25, after "data;" insert -- wherein the identified map includes a series of offset-length pairs and literal value-length pairs to create the formatted results data, where, for the offset-length pairs, the offset indicates the beginning location within the results data for the formatted data and the length indicates how much of the results data to use as part of the formatted results data and, for the literal value-length pairs, the literal value indicates an actual value for the formatted results data and the length indicates how much of the literal value to use as part of the formatted results data; --

Signed and Sealed this

Nineteenth Day of November, 2002

*Attest:*

*Attesting Officer*

JAMES E. ROGAN
*Director of the United States Patent and Trademark Office*